Jan. 9, 1968 H. GREINER 3,363,055
ARRANGEMENT FOR REINSERTING THE D.C. COMPONENT INTO A SIGNAL
WITH PERIODICALLY RECURRENT REFERENCE VALUES
Filed July 27, 1964

Inventor:
HERMANN GREINER

Michael J. Striker
by attorney

United States Patent Office
3,363,055
Patented Jan. 9, 1968

3,363,055
ARRANGEMENT FOR REINSERTING THE D.C. COMPONENT INTO A SIGNAL WITH PERIODICALLY RECURRENT REFERENCE VALUES

Hermann Greiner, Darmstadt, Germany, assignor to Fernseh G.m.b.H., Darmstadt, Germany Filed July 27, 1964, Ser. No. 385,189
Claims priority, application Germany, Aug. 1, 1963, F 40,385
7 Claims. (Cl. 178—7.1)

ABSTRACT OF THE DISCLOSURE

A clamping pulse having an amplitude which decreases throughout the clamping time is generated by partial differentiation of a square pulse and applied to the diode clamping circuit forming part of a conventional direct current restorer circuit. The amplitude of the pulse is such that the diode resistance is very small during the first part of the clamping time and then increases continuously during the second part of the clamping time. This results in an averaging of circuit noise, or decreased fluctuations.

The present invention relates in general to an arrangement for reinserting the D.C. component into a signal with periodically recurrent reference values. In particular, the invention concerns an arrangement for D.C. restoration in a television signal. For reinserting the D.C. component, which has been lost during transmission of the signal, there are known gated clamp circuits comprising a capacitor, by way of which the signal is transmitted, and controlled impedance elements as a rule diodes or transistors, one terminal of which is connected to the signal lead after the capacitor while the other terminal is connected to a point of fixed potential.

During the times, in which the signal contains the reference value, the controlled impedance elements are caused to conduct by clamping pulses. Thereby the signal lead is connected to the point of fixed potential during these times. The time constant of the clamp circuit is usually chosen as short as possible. Thereby a rapid and possibly complete change in charge of the capacitor is achieved, so that the potential of the signal lead after the capacitor corresponds almost exactly to the fixed potential (reference potential). When making use of high-vacuum diodes in the clamp circuit, the time constant may e.g. be 1 μsec. with a resistance of the gated diode of the order of 100 ohms and with a capacity of the capacitor of the clamp circuit of about 1000 pf.

There are frequently superimposed upon the signal interferences, for example noise, which are present in the signal even over the duration of the reference values. The potential appearing at the signal lead then no longer exactly corresponds to the reference potential, but is subject to irregular fluctuations. When the diodes in the clamp circuit are suddenly blocked by the trailing edges of the gating pulses, at the end of the clamping time the instantaneous value of the interference voltage superimposed upon the reference value corresponds to the reference potential. Since this instantaneous value is of different magnitude during the successive clamping times, the potential at the signal lead will more or less deviate from the correct value. In the case of a television signal this means that the brightness value of the line subsequent to each clamping time is different. This results in an interference which is known under the term of "streaking" visible on the screen of the television receiver as irregular brightness fluctuations of individual lines or of a group of lines, which is extremely disturbing.

It is a general object of the invention to provide an arrangement for reinserting the D.C. component into a signal with periodically recurrent reference values by means of a gated clamp circuit diminishing the interferences caused by the noise superimposed upon the signal and also present over the duration of the reference values.

It is a particular object of the invention to provide an arrangement for the D.C. restoration in the television signal of the kind described above.

It is a further object of the invention to provide an arrangement as described above with a clamp circuit, wherein the time constant of the capacitor and the controlled impedance element is short in a first part of the clamping time and is continuously increased in the subsequent second part of the clamping time.

It is another object of the invention to provide an arrangement as described above with a clamp circuit operating with clamping pulses, of which the amplitudes are great in the first part of the clamping time and are gradually reduced in the second part of the clamping time.

The arrangement according to the invention possesses the advantage, that the clamp circuit operates with a signal, in which the reference value is subject to fluctuations caused by interference voltages of high frequency, for example the high-frequency portions of the noise spectrum, practically as well as with a signal free of interference.

When making use of diodes or transistors as controlled impedance elements, these are completely conductive only during the first part of the clamping time and are subsequently driven into the blocking region, preferably so far, that they are already completely blocked at the end of the clamping time. This may be effected in a particularly simple manner in any known clamp circuit by use of gating pulses having amplitudes necessary for completely opening the diodes or transistors during the first part of the clamping time and by decreasing the amplitude of the gating pulses during the second part of the clamping time to such a degree that the diodes or transistors of the clamp circuit are blocked at the end of the clamping time. Pulses of this shape with slanting tops can in a most simple way be obtained by partial differentiation of rectangular pulses.

The arrangement according to the invention is of particular significance for D.C. restoring in television signals, since these frequently contain a considerable interference portion. This may already be contained in the television signal itself produced by the pickup tube or photocell or may be superimposed during transmission of the signal. In every case the application of the arrangement according to the invention for reinserting the D.C. component into the television signal entails an essential improvement, in particular the elimination of the highly disturbing "streaking." Further objects and advantages will become more apparent from the following description taken in conjunction with the figures, in which:

Figure 1:
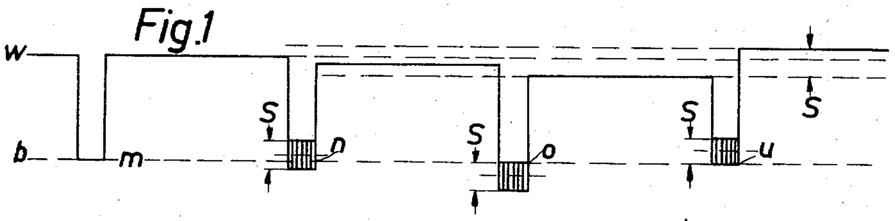
FIG. 1 is a schematic representation of the effects of interferences in the reference value on a television signal according to the conventional arrangement.

FIG. 1 shows some line sweep periods of a television signal, which is produced on scanning an area of constant brightness. Therefore, the signal has a constant amplitude $w$ during the line sweep periods. Within the horizontal fly-back time a constant reference value (black value) is transmitted. This reference value is to be brought to the constant reference potential $b$ by the clamp circuit. In order to simplify the representation, it is assumed that the clamping time corresponds to the duration of the reference value (in practice it is mostly somewhat shorter). In addition, the controlled impedance elements, for example diodes, of the clamp circuit, shall be completely conductive during the clamping time, as it has been usual, so that they have a very small resistance and the time constant of the clamp circuit is short during the whole of the clamping time. In a signal free of interference the reference value in the signal $m$ is brought to the reference potential $b$ by the clamp circuit as is represented in the figure for the first horizontal fly-back time. For the succeeding fly-back times it is assumed that there is superimposed an interference on the signal and that the reference value fluctuates an amount $s$. At the end of the clamping time, at the sudden increase of the resistance of the clamp circuit by the trailing edges of the clamping pulses, the signal value present at that instant is brought to the reference potential $b$. This signal value at the end of the clamping time may have any value within the amplitude fluctuation $s$ and may fluctuate between the values $o$ and $u$. It follows that the amplitude of the picture signal in the individual line sweep periods also fluctuates irregularly between the extreme values of the interference voltage $s$.

Figure 2:
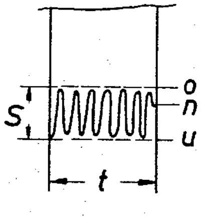
FIG. 2 represents a periodically recurrent reference value represented in FIG. 1 in enlarged scale.

FIG. 2 is a representation of the foregoing for a reference value in enlarged scale under the assumption that the interference is a high-frequency oscillation with a period of oscillation short in comparison with the duration of fly-back times. It is to be seen that depending on the phase relation of the oscillation at the end of the clamping time $t$ any value $n$ between the extreme values $u$ and $o$ of the interference oscillation is clamped to the reference value $b$ by the clamp circuit.

Figure 3:
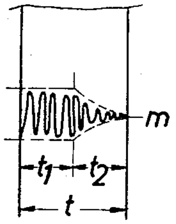
FIG. 3 represents a reference value as illustrated in FIG. 1 when applying the arrangement according to the invention.

FIG. 3 shows the behavior of the clamp circuit according to the invention during the clamping time $t$. The time constant of the clamp circuit is short only in the first part $t_1$ of the clamping time $t$. This time need only be long enough for the capacitor of the clamp circuit to acquire a charge which corresponds approximately to the changed potential of the reference value. During the subsequent time $t_2$ the time constant of the clamp circuit is continuously increased. This is effected in the most simple manner by a gradual rise of the resistance charging the capacitor of the clamp circuit. The value of the resistance at the end of the clamping time should preferably be practically infinite, as it is the case during the interval between the clamping times. In the second part of the clamping time, $t_2$, the interferences superimposed upon the reference value are thereby progressively integrated, so that the clamping at the end of the clamping time is effected on about the mean value $m$ of the interference superimposed upon the reference value.

Figure 4:
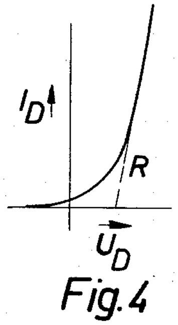
FIG. 4 is the characteristic of a diode used as controlled impedance element in a clamp circuit.

If diodes or transistors are used as controlled impedance elements, use may be made of the fact that these elements need not suddenly change from a conducting to a non-conducting state, but that their effective resistance may be gradually changed as a function of applied voltage. A typical diode characteristic is shown in FIG. 4. The effective resistance is given by the slope of a line tangent to the curve (line R). It changes from a low value at high applied voltage $U_D$, to a high value (and finally $I_D=0$) at low values of $U_D$.

Figure 5:
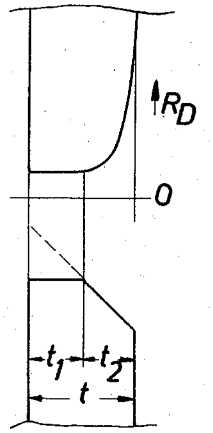
FIG. 5 represents the control of the diode resistance by the clamping pulse.

FIG. 5 shows the manner in which the diode resistance $R_D$ may from a very small value in the first part $t_1$ of the clamping time $t$ be continuously increased in the second part $t_2$ of the clamping time $t$ by a clamping pulse of specific shape. For this purpose the shape of the clamping pulse is such that its amplitude has an extreme value in the first part $t_1$ of the clamp time $t$, which is at least long enough for the diode to become completely conductive. In the second part $t_2$ of the clamping time $t$ this value is gradually reduced until the diode is blocked at the end of the clamping time.

Figure 6:
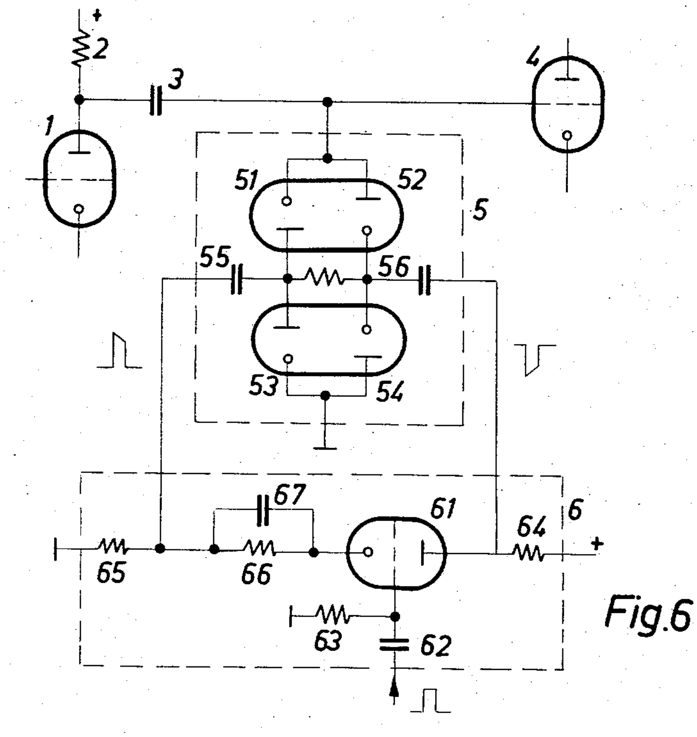
FIG. 6 is an embodiment of a clamp circuit and of a pulse shaper for the application of the arrangement according to the invention.

FIG. 6 shows a clamp circuit for a television signal, operating according to the invention. One terminal of the capacitor 3 of the clamp circuit (e.g., 1000 pf.) is connected to the load resistance 2 of a tube 1, by way of which the signal is applied, while the other terminal is connected to the control electrode of a further tube 4, at which the reference value of the signal is to be brought to a fixed potential, for example to ground potential, by means of the clamp circuit 5. In the figure is represented a four diode clamp circuit 5 consisting of two double diodes 51, 52 and 53, 54 respectively connected in anti-parallel. During the clamping times these diodes are gated by clamping pulses applied by way of the capacitors 55, 56 (e.g., 50 nf. each). Before the clamping pulses are applied to the clamp circuit 5, these pulses are partially differentiated. The rectangular clamping pulses with flat tops are for this purpose applied to the pulse shaper 6, a means for generating a clamping signal. This contains a tube 61, which is controlled by the rectangular clamping pulses by way of a capacitor 62 (50 nf.) with leakage resistance 63 1M ohms). The pulses with inverse polarity necessary for the four diode clamp circuit are taken from the resistances 64 and 65 (e.g., each 500 ohms) at the anode and cathode respectively of the tube 61. In the cathode circuit there is a differentiating element consisting of the resistor 66 (e.g., 1.5K ohms) and the capacitor 67 (e.g., 5 nf.) connected in parallel. The effect is that the pulse amplitude is decreased over the pulse duration and the pulses applied to the diodes take approximately the form represented in FIG. 5.

The application of the arrangement is not limited to the clamp circuit described, but can be applied with the same advantages also in other singly or doubly gated clamp circuits comprising diodes or transistors. The generation of the pulses for gating the clamp circuit is likewise possible not only by differentiation of the standard pulses, but in any other suitable way.

It is intended that all matter contained in the above description or shown in the accompanying drawings shall be interpreted as illustrative and not in a limiting sense.

What is claimed and desired to be secured by Letters Patent is:

1. An arrangement for minimizing the effect of noise in a circuit adapted to clamp a signal to a reference potential at predetermined time intervals and for predetermined clamping times, comprising in combination, a source of reference potential; output amplifier means having an input element; a variable impedance element connected between said source of reference potential and said input element and having an impedance which varies as a function of an applied clamping signal; coupling means for applying said signal to said input element and said variable impedance element constituting in conjunction with said variable impedance element, a direct current restorer circuit having a variable time constant; and means for generating a clamping signal adapted to cause the impedance of said variable impedance element to vary in such a manner that said variable time constant will be very short for a first part of said clamping time and will increase continuously during a second part of said clamping time, thus causing an averaging of circuit noise.

2. An arrangement as set forth in claim 1, wherein said signal is a television signal and said clamping times are substantially equal to the horizontal flyback time of said television signal.

3. An arrangement as set forth in claim 1 wherein said coupling means comprises a capacitor; and wherein said variable impedance element comprises at least one diode having a resistance which varies as a function of an applied clamping voltage.

4. A system as set forth in claim 3 wherein said means for generating a clamping signal comprises means for generating a pulse having an initial high amplitude, but adapted to decrease in such a manner that the resistance of said diode will increase during the second part of said clamping time.

5. An arrangement as set forth in claim 3 wherein said variable impedance element comprises a first and a second double diode, the first half of said first double diode being connected in series opposition to the first half of said second double diode, the second half of said first double diode being connected in series opposition to the second half of said second double diode, said two series connections being connected in parallel between said input element and said source of reference potential.

6. An arrangement as set forth in claim 3 wherein sai reference potential is ground potential.

7. An arrangement as set forth in claim 4 wherein sai pulse generating means comprises amplifier means havin an input and an output circuit; means for applying squar pulses to said input circuit; and differentiating means i said output circuit to differentiate said square top pulse thus generating pulses of decreasing amplitude.

References Cited

FOREIGN PATENTS 613,978 2/1961 Canada.

JOHN W. CALDWELL, *Primary Examiner.*

R. L. RICHARDSON, *Assistant Examiner.*